US008271689B2

(12) United States Patent
Bannoura et al.

(10) Patent No.: US 8,271,689 B2
(45) Date of Patent: Sep. 18, 2012

(54) SYSTEM AND METHOD FOR PARTIAL DATA COMPRESSION AND DATA TRANSFER

(75) Inventors: Daniel Bannoura, The Colony, TX (US); Andre Angel, Plano, TX (US)

(73) Assignee: Netcordant, Inc., Plano, TX (US)

( * ) Notice: Subject to any disclaimer, the term of this patent is extended or adjusted under 35 U.S.C. 154(b) by 0 days.

(21) Appl. No.: 13/091,628

(22) Filed: Apr. 21, 2011

(65) Prior Publication Data

US 2011/0196988 A1    Aug. 11, 2011

Related U.S. Application Data

(63) Continuation of application No. 12/342,741, filed on Dec. 23, 2008, now Pat. No. 7,945,698, which is a continuation of application No. 10/280,597, filed on Oct. 25, 2002, now Pat. No. 7,484,007.

(60) Provisional application No. 60/353,507, filed on Feb. 1, 2002.

(51) Int. Cl.
*G06F 15/16* (2006.01)

(52) U.S. Cl. ........................ 709/247; 709/246

(58) Field of Classification Search .................. 709/247, 709/246, 203
See application file for complete search history.

(56) References Cited

U.S. PATENT DOCUMENTS

| | | | | |
|---|---|---|---|---|
| 5,293,379 | A * | 3/1994 | Carr | 370/474 |
| 5,293,397 | A * | 3/1994 | Veligdan | 372/25 |
| 5,813,017 | A | 9/1998 | Morris | |
| 5,862,347 | A | 1/1999 | Suzuki et al. | |
| 5,883,975 | A * | 3/1999 | Narita et al. | 382/232 |
| 5,894,588 | A | 4/1999 | Kawashima et al. | |
| 5,973,696 | A * | 10/1999 | Agranat et al. | 715/760 |
| 6,349,372 | B1 * | 2/2002 | Benveniste et al. | 711/159 |
| 6,678,737 | B1 | 1/2004 | Bucher | |
| 6,681,058 | B1 * | 1/2004 | Hanna et al. | 382/294 |
| 6,954,801 | B1 * | 10/2005 | Housel | 709/247 |
| 2002/0103918 | A1 * | 8/2002 | Miller et al. | 709/231 |
| 2002/0120644 | A1 | 8/2002 | Roberts et al. | |
| 2002/0129168 | A1 | 9/2002 | Kanai et al. | |
| 2002/0161835 | A1 | 10/2002 | Ball et al. | |
| 2003/0014483 | A1 | 1/2003 | Stevenson et al. | |
| 2003/0028673 | A1 | 2/2003 | Lin et al. | |
| 2004/0049598 | A1 | 3/2004 | Tucker et al. | |
| 2004/0136377 | A1 | 7/2004 | Miyazaki et al. | |
| 2005/0080850 | A1 | 4/2005 | Salesky et al. | |

* cited by examiner

*Primary Examiner* — Ario Etienne
*Assistant Examiner* — El Hadji Sall
(74) *Attorney, Agent, or Firm* — Haynes and Boone, LLP

(57) ABSTRACT

The present invention provides a system and method for data transfer. The system may include a client having software adapted to display data; a storage; and client data. Further, the system may include a server having compressor data and information regarding data file types that have been partially compressed by the compressor data. In the system, the client may be operably coupled to the server for data and file transfer purposes.

14 Claims, 5 Drawing Sheets

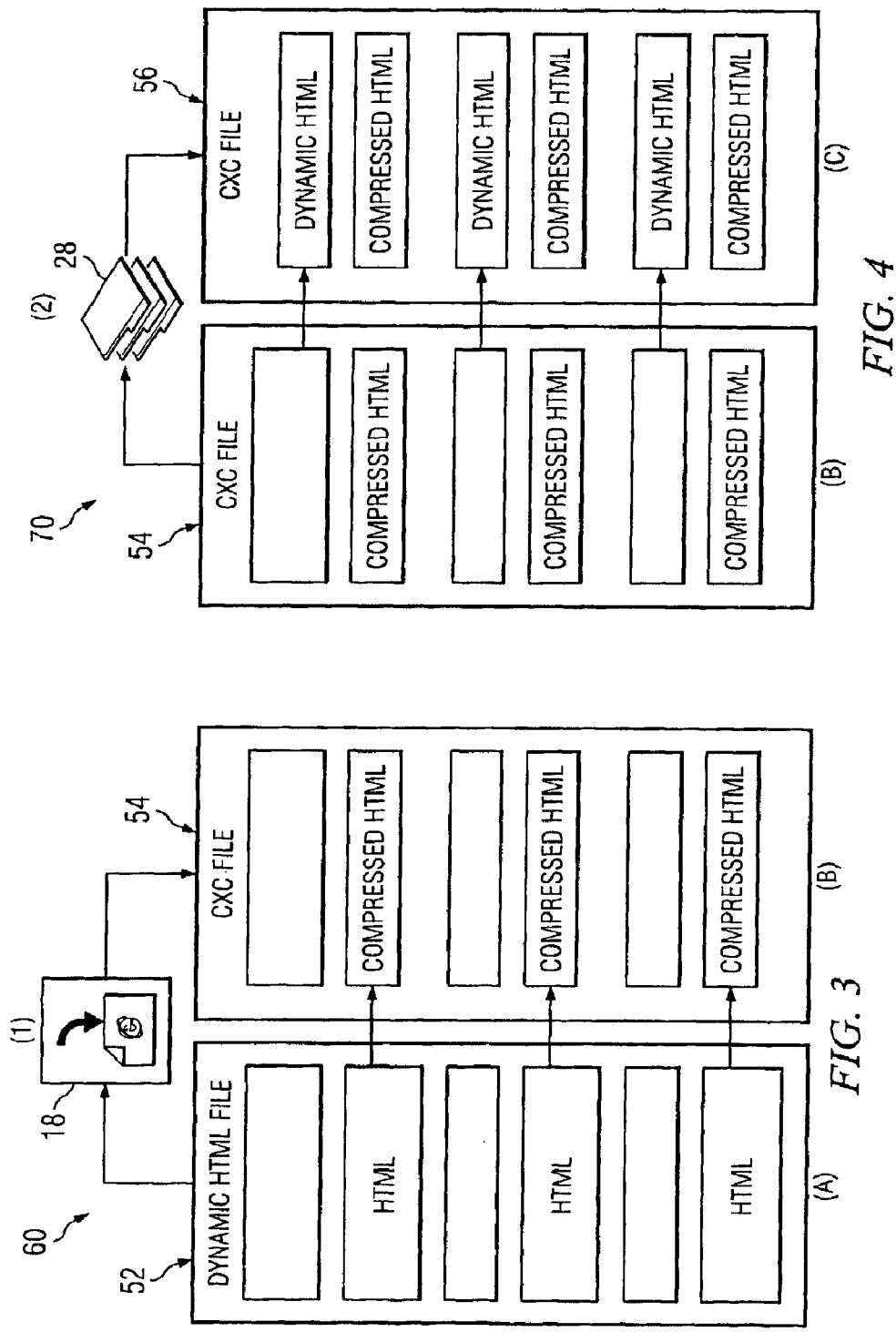

SYSTEM AND METHOD FOR PARTIAL DATA COMPRESSION AND DATA TRANSFER

CROSS-REFERENCE TO RELATED APPLICATIONS

The present application is a continuation of U.S. patent application Ser. No. 12/342,741 filed Dec. 23, 2008, published as Pub. No. 2009-0327523, which is a continuation of U.S. patent application Ser. No. 10/280,597 filed Oct. 25, 2002, now U.S. Pat. No. 7,484,007, which claims the benefit of U.S. Provisional Application No. 60/353,507 filed Feb. 1, 2002. The entire contents of each of these earlier applications is hereby incorporated by referenced for all purposes.

BACKGROUND OF THE INVENTION

The present invention relates to data compression and, more particularly, to a system and method for partial data compression and data transfer.

As connectivity to the World Wide Web grows, Internet traffic and transaction volume continue to rise as. According to various sources (such as the Computer Industry Almanac) active Internet users are expected to exceed 850 million worldwide by the end of 2005. Companies, portals and hosting providers must continuously face the challenge of expanding infrastructure to manage the increase in demand for content and services, and to maintain quality of service. Businesses are dedicating more of their IT budgets to Internet related services (bandwidth and infrastructure). According to other sources (such as the Cahners In-Stat Group) Internet spending will grow to over 24% of Information Technology budgets in the U.S. or over $200 billion in 2004.

Managing quality of service, which is driven primarily by consumer demand and required by competition, cannot be solved with infrastructure and content alone. The problem is that as the number of Internet users is increasing, and more consumers are looking for rich content (especially broadband users) more megabits of data must be delivered to end-users. This forces companies to rely on new services and technologies that optimize current infrastructure investments. Such services and technologies include media compression, network caching, and innovative pricing models for hardware and connectivity. Media compression and pricing have been "squeezed" to give maximum return on investment, but more recently, these solutions have not been proven successful in sustaining profitability or cost savings per megabit delivered.

As companies turned to network caching solutions, they found that over time, the cost per megabit delivered actually increased with little or no return on investment. Most solutions currently available focus on the end user and are not designed to reduce operating costs for providers and hosting companies. These companies have been forced to optimize cost pricing models and use the latest media compression algorithms. In addition, web site designers use fewer media and more text when implementing web pages. Eventually, the same problems will occur with text dominated web sites as the number of connected users increase over time and technology infrastructure becomes more difficult to manage due to size, distribution, and operating costs.

Current solutions for solving capacity and performance issues fall into two main categories—content caching and compression. These solutions focus on the end user by solving or masking "last mile" issues by reducing bandwidth consumption or distributing the load oil web servers across the network to reduce latency. There are serious pitfalls to these two approaches: neither reduces costs or increase revenues for most companies and neither offers tangible benefits to the end user. In fact, the overall cost of operations usually increases with little or no demonstrable return on investment.

Network caching has proven itself to be effective in managing flash crowding and latency for content providers that do not have rapidly changing, or dynamic web sites. However, caching requires external hardware and bandwidth that is marked up and resold to the content provider much the same way data centers operate. The only relief content providers get is not having to manage larger data centers. In effect, a portion of the hosting is out-sourced, leading to higher long-term costs. In an outsourced model, data centers are widely distributed across the Internet backbone. Dynamic sites do not benefit because remote servers require continual updating. The only major benefit is to the end user who can download pages from the edge of the network a little faster than going back to the original source.

Dynamic "on-the-fly" compression reduces throughput requirements and decreases download times for end users. However, the content provider incurs additional cost with this approach, especially with high volume sites. A problem with on-the-fly compression is that web servers consume additional CPU and memory resources to compress the content "on-the-fly," leaving fewer resources available to manage connections, transactions, and data transfer. If there are less server resources available, more servers must be installed to maintain original capacity. This drives operating costs higher, offsetting any savings in bandwidth. Typically, companies that manage high volume web sites will disable this feature due to the tremendous strain on server hardware and the costs of offsetting the strain with additional hardware.

Other methods include pre-compression of the HTML and XML files and partial file transfers. Pre-compression of web page files before hosting them on a web server is not practical. Most sites are database driven and have to dynamically create web pages. Partial File Transfers is a recent technology developed to deliver only the changes in a web page. This is made possible by the HTTP1.1 standard supporting resumeable downloads. This may sound ideal, however, it also consumes additional server resources and dramatically decreases infrastructure capacity.

Several attempts at solving some of these problems have been made, but business models supporting these services have yet to prove themselves successful or profitable. The source of the failure is that these companies target end user issues and not enterprise's issues. A new solution is needed to reduce costs and increase the quality of service for these companies, and as a consequence, the end user will benefit.

Therefore, it is desirable for the present invention to overcome the conventional problems and limitations associated with content caching and compression.

SUMMARY OF THE INVENTION

The present invention achieves technical advantages as a system and method for partial data compression and data transfer. In one embodiment, a method for data transfer comprises requesting a first data, attaching an identifier to a response related to the request, intercepting the response for the first data, determining if a second data is available, the second data comprising compressed data and uncompressed data, and, if the second data is available, requesting the second data associated with the identifier, sending the second data, receiving the second data, and uncompressing the compressed data of the received second data.

In another embodiment, a method for file transfer comprises marking static data in a data file, compressing the marked static data, creating a new data file comprising the compressed static data and uncompressed dynamic data from the data file, requesting the data file, attaching an identifier to a response, redirecting the request to the new data file, and sending the new data file.

In yet a further embodiment, a system for data transfer comprises a client comprising storage and a client data, and a server comprising a compressor data and information regarding data file types that have been compressed by the compressor data, wherein the client is operably coupled to the server, wherein the client data intercepts a response for a requested data file stored on the server. If the requested information includes an identifier (for example, indicating a type of compression is supported), the method includes requesting, by the client data, a compressed version of the data file, wherein the data file is one of the data file types that have been compressed, wherein the client data: sends the compressed version of the file to the storage, uncompresses the compressed version, stores the uncompressed version in the storage, and instructs the client to access the stored uncompressed version.

In yet another embodiment, a system for data transfer comprises a client comprising software adapted to display data, storage, and client data, and a server comprising compressor data and information regarding data file types that have been partially compressed by the compressor data, wherein the client is operably coupled to the server, wherein the client data intercepts a response for a requested data file stored on the server. If the requested information includes an identifier (indicating compression is supported), the method includes requesting, by the client data, a partially compressed version of the data file, wherein the data file is one of the data file types that have been partially compressed, wherein the partially compressed version of the file is: sent to the storage, accessed from the memory, and uncompressed by the client data, wherein the uncompressed version of the file is sent to the storage, and wherein the software accesses the uncompressed version of the file in the storage.

BRIEF DESCRIPTION OF THE DRAWINGS

FIG. 3 depicts a process flow diagram that details the information compression portion according to the present invention;

FIG. 4 depicts a process flow diagram that details the information processing portion according to the present invention;

DETAILED DESCRIPTION OF THE INVENTION

Figure 1:
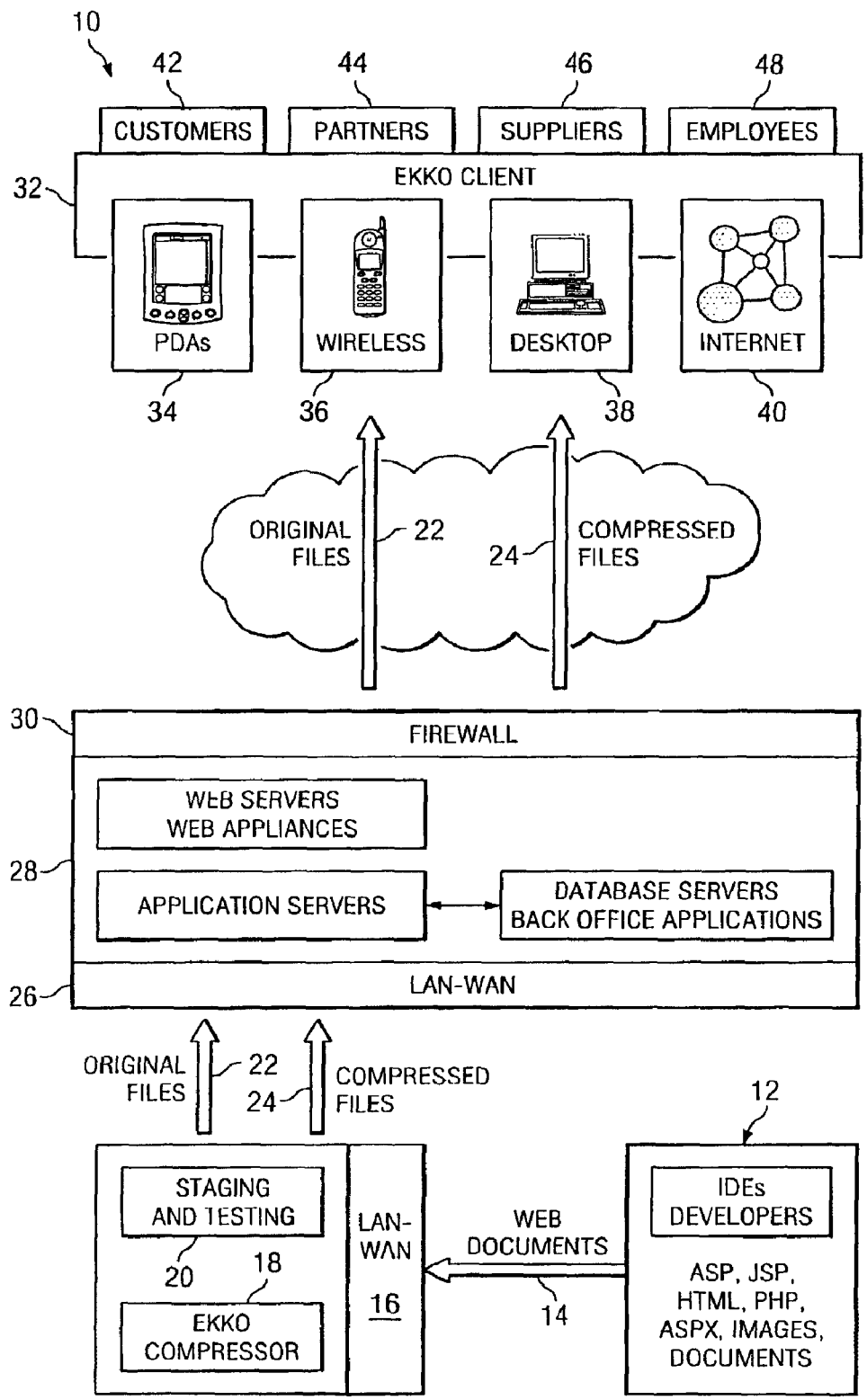
FIG. 1 depicts a block diagram of a system architecture according to the present invention.

FIG. 1 depicts a system 10 that utilizes the present invention, which includes, and is referred to hereinafter, as an Ekko Compressor 18 and an Ekko Client 32, which are software (such as Java) based applications that runs on any platform (supported, for example, by the Java Runtime Environment that is used in a pre-production stage to compress web content. The Ekko Compressor 18 application is configured by selecting the file types and directories targeted for compression and by selecting the server side scripting language for each file type such as ASP, Cold Fusion, PHP, JSP and others. Compression can be automated using a built in scheduling feature or performed manually on an as needed basis. Detailed reporting and logging provide information on status, progress, and errors.

The system 10 comprises a module 12 that produces web pages, images, office documents, or any other binary file type depicted as web documents 14. These web documents 14 are sent to the Ekko Compressor 18 and a staging and testing module 26 via a LAN or WAN 16. The Ekko Compressor 18 can be installed and run from the staging and testing module 26 (and preferably not in a production environment). A developer or administrator can point the Ekko Compressor 18 application to the web documents in development and target selected files and directories for compression. Compression is performed using an efficient high ratio compression algorithm that can be applied to ASCII and binary files effectively with no data loss.

The Ekko Compressor 18 can reduce network infrastructure (by enabling applications to deliver less data and deliver it faster) and can be installed and executed in a development or staging environment where files are compressed and optimized before being uploaded to production. The Ekko Compressor 18 is described in more detail in FIGS. 2, 3, and 6. Original files 22 and compressed files 24 are produced and sent to a web server, application server, or database server module 28 via a LAN or WAN 26. The LAN or WAN 16, 26 are shown as examples and may be any type of network that permits data transfer. The processing of data in the module 28 is described in further detail in FIGS. 2, 4, and 6.

The original files 22 and the compressed files 24 are sent from the module 28 to various devices (such as a PDA 34, a mobile phone 36, a computer 38, or a data network 40) via, for example, a firewall 30. It should be noted that the firewall 30 does not have to be provisioned to allow the original files 22 and the compressed files 24 to be received at the devices. When the original files 22 and the compressed files 24 are received, a plug-in, such as a browser plug-in or the Ekko Client 32 decompresses the compressed files 24 and displays them to users (such as customers 42, partners 44, suppliers 46, and employees 48) via the devices. The Ekko Client 32 is installed at the end user to uncompress the files. The compressed files pass through the production environment reducing infrastructure requirements, increasing performance, reducing cost of ownership, and speeding up end user experience. The Ekko Client 32 is described in more detail in FIGS. 2, 5, and 6.

Both static HTML pages and server-side scripted pages contained in module 12 (such as ASP, JSP, or PHP, as well as images, documents, and binary files) are compressed to a file type (herein referred to as a Codekko Compressed Code (CXC) file) before they are uploaded to any production application servers or web servers 28. The Ekko Compressor 18 allows compression of all web pages without breaking server-side scripting compatibility and the servers that generate and serve content never need to run any compression algorithms to process transactions, generate content, and deliver content in a compressed format. The Ekko Compressor 18 can also be easily configured to adapt to custom scripting languages and server-side scripting technologies, and provides full compatibility and seamless plug-and-play integration with all web-based standards such as HTTP, HTTPS/SSL, IPSec, encryption, edge caching, and others. HTML content that is compressed by the Ekko Compressor 18 goes through three basic stages—compression, delivery/processing, and decompression described, respectively, in FIGS. 2-4. Each stage is executed in an isolated environment with no dependencies on each other. Stage 1 is the compression stage performed by the Ekko Compressor 18 in a development or staging environment, stage 2 is executed by the web or application server 28 where the compressed files are processed and delivered, and stage 3 is performed by the browser plug-in, or Ekko Client 32, where the compressed content is decompressed and displayed to the end user.

Figure 2:
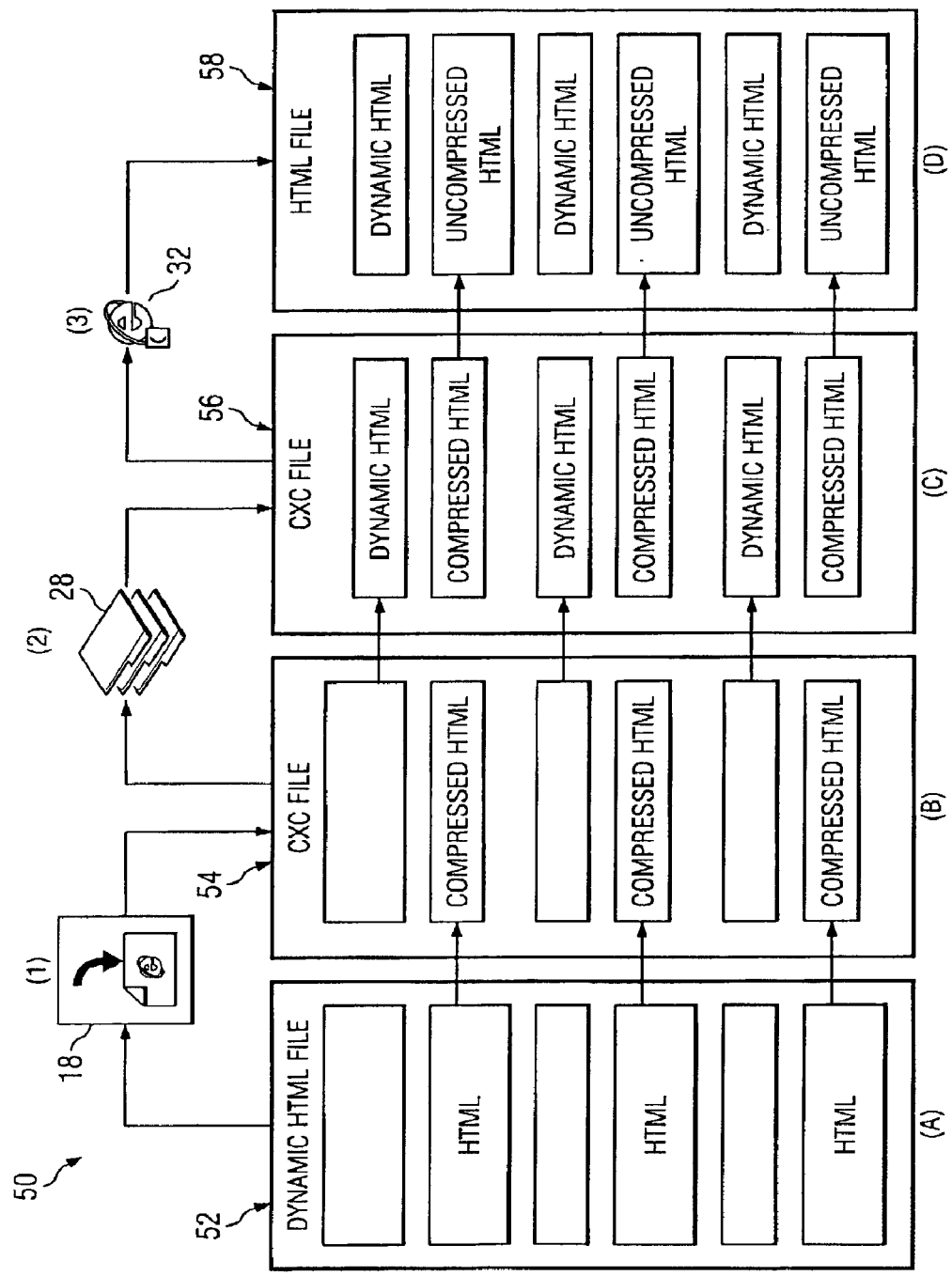
FIG. 2 depicts a process flow diagram that compresses, processes and decompresses information according to the present invention.

Referring now to FIG. 2, a process flow diagram 50 that compresses, processes and decompresses information is depicted. The life cycle of the HTML file from compression to processing/delivery, to decompression is depicted where an HTML file 52 is compressed by the Ekko Compressor 18 creating a CXC file 54. The server 28 processes a request for compressed content 56 and generates a dynamic page using the compressed content. The Ekko Client 32 receives the compressed content 56 and decompresses it back to its original HTML file form 58.

Referring now to FIG. 3, a process flow diagram 60 that details the information compression portion is depicted. The first stage of compressing HTML based content that contains dynamic server side scripting is depicted. The Ekko Compressor 18 optimizes and compresses the static HTML portions of the file 52 while preserving all server side compatibility for dynamic content scripting. The file 52 is copied, compressed, and renamed to the original file name with a CXC appended to designate a compressed file 54. The compressed CXC files are stored in the same location as the original files which are not modified in any way to preserve full reverse compatibility.

The HTML files 52 are parsed based on the configuration of the server side scripting selection in the Ekko Compressor 18 which divides the file 52 into two sections, dynamic and static. The dynamic, usually server side scripting, is preserved and only the static content, usually the HTML, is compressed. The Ekko Compressor 18 assembles the dynamic portions of the file with the compressed portions to create a new copy of the file 54. The new copy 54 is a partially compressed version of the original.

Referring now to FIG. 4, a process flow diagram 70 that details the information processing portion is depicted. Once the Ekko Compressor 18 has compressed the web content in the development stage and tested it, a copy of the original content and a copy of the compressed content are uploaded to the production environment. There is no additional software required in the production environment to process and serve compressed CXC content. Existing web servers and application servers require a minor modification to the HTTP response headers by adding a custom entry to the response header list. Most platforms support this feature and the change usually does not require more than a few minutes to perform.

The production web servers and application servers have access to the CXC content which reside side by side with the original content. The CXC content is ignored until a request for compressed content is received. When a CXC request is received by a browser which includes the installed Ekko Compressor plug-in 18, the server 28 loads the CXC file 54, parses out the server side script, and executes the script in the file. The server 28 creates a new copy of the requested file 56 and replaces all server side script with dynamic HTML that was generated by the script. The new file now contains dynamic HTML generated by the server side script and compressed HTML that was compressed using the Ekko Compressor 18 in the development stage. The new file can then be delivered to the requesting browser.

Server response times are dramatically improved because each request for compressed content can be processed two to three times faster. This translates to a reduction in the server's request queue and a reduction in the time required to deliver the data. When serving compressed content, one server can process the same number of requests as three servers. This leads to a tremendous increase in performance and capacity.

Figure 5:
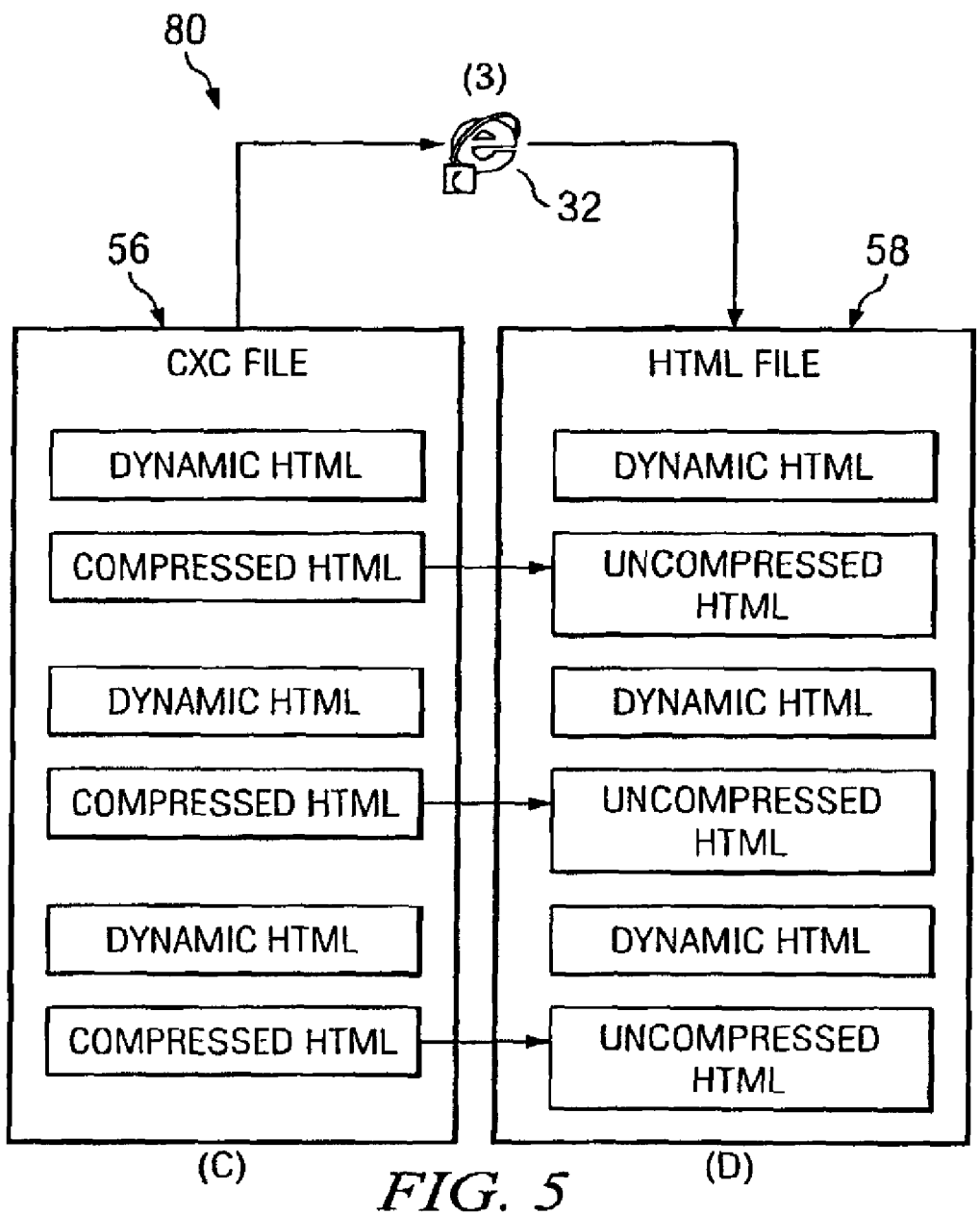
FIG. 5 depicts a process flow diagram that details the information decompression portion according to the present invention.

Referring now to FIG. 5, a process flow diagram 80 that details the information decompression portion is depicted. The Ekko Client plug-in 32, which is a browser plug-in that is preferably less than 20 kb in size, intercepts requests for content, evaluates the request by retrieving an HTTP response header from the server that hosts the content, and directs the browser to the compressed content if it exists. If the compressed content is found on the server, the plug-in downloads the compressed content into the browser cache, decompresses it, creates a new decompressed file in cache, and navigates the browser to the file in cache.

When a user with the installed Ekko Client 32 requests an HTML file from a server, the plugin intercepts the request and puts the request on hold before the browser has a chance to begin processing the request. While the request is on hold, the plug-in calls the server requesting an HTTP response header to determine if a compressed version of the file exists. If a compressed version exists, the plug-in downloads the compressed file CXC file. The compressed CXC file 56 has been delivered by the server to the browser cache. The plug-in 32 parses the contents of the CXC file and decompresses the compressed HTML while preserving the dynamic HTML. The plug-in 32 creates a new file 58 in cache that consists of the dynamic HTML and the uncompressed HTML. The new file can be named after the original pending request that is on hold within the browser. Once the new uncompressed file has been created, the original request is released and allowed to execute. The browser's default behavior is to check the browser cache for the requested file. When the browser checks the cache, it should find the requested file that was placed there by the plug-in. The browser loads the file and displays it to the user's device.

The end user does not notice and cannot tell what the plug-in 32 is doing in the background. The parsing and decompression requires about 50 ms to about 100 ms to process, but the time saved in downloading smaller files produces a substantial net gain in performance. Download times can decrease three to five times making connection speed perform much faster and require less time.

In one embodiment of the present invention, a method for partial data compression comprises selecting a file to be compressed, creating a copy of the file, the copied file comprising at least one start point and at least one end point, compressing data within the start point and the end point, and creating a new file comprising the compressed data and uncompressed data. The method further comprises selecting a location comprising the file to be compressed (wherein the new file is located in the location or in another location), sending the new file to a module based on a request from the module, uncompressing the compressed data in the new file at the module, and providing the uncompressed compressed data and the uncompressed data at the module. The copied file further comprises the uncompressed data and is temporarily stored. The compressed data is static data, while the uncompressed data is dynamic data.

In another embodiment of the present invention, a method for partial data compression comprises determining static data and dynamic data in a data file, marking the static data, compressing the marked static data via a compression algorithm, creating a new data file comprising the dynamic data and the compressed static data, and sending the new data file to a location of the data file. The method may further comprise providing an identifier to the new data file, determining if the identifier exists when a request for the data file is received, providing the new data file, if the identifier exists when the request is received, and providing the data file, if the identifier does not exist when the request is received, wherein the data file comprises uncompressed data. The method may also comprise selecting a compression algorithm to perform the compression, dynamically marking the static data, dynamically marking the dynamic data, providing qualifiers related to the static data, providing qualifiers related to the dynamic data, and marking the static data by a user.

In a further embodiment of the present invention, a method for data transfer comprises requesting a first data, attaching an identifier to a response related to the request, intercepting the response for the first data, and determining if a second data is available, the second data comprising compressed data and uncompressed data. If the second data is available, requesting the second data associated with the identifier, sending the second data, receiving the second data, and uncompressing the compressed data of the received second data. The method may further comprise displaying the uncompressed compressed data and the uncompressed data, displaying the uncompressed compressed data and the uncompressed data in an order similar to an order of the first data, and displaying the uncompressed compressed data and the uncompressed data in an order dissimilar to an order of the first data. The method may also comprise sending the first data if the second data is unavailable, sending the first data if the identifier is not attached to the response, and sending tracking information if the second data is unavailable.

In yet another embodiment of the present invention, a method for file transfer comprises marking static data in a data file, the data file additionally comprising uncompressed dynamic data, compressing the marked static data, creating a new data file comprising the compressed static data and the uncompressed dynamic data, and providing an identifier to the new data file. The method may further comprise storing the new data file.

In yet another embodiment of the present invention, a method for file transfer comprises marking static data in a data file, compressing the marked static data, creating a new data file comprising the compressed static data and uncompressed dynamic data from the data file, requesting the data file, attaching an identifier to a response, redirecting the request to the new data file, and sending the new data file.

In yet a further embodiment of the present invention, a system for data compression comprises a client comprising a client data, and a server comprising a compressor data, wherein the client is operably coupled to the server, wherein the server further comprises information regarding data file types able to be compressed by the compressor data, wherein the compressor data selects a data file to compress and to identify data within the data file to be compressed, wherein the selected data file to compress is one of the data file types, wherein the compressor data compresses the identified data, and wherein the compressor data creates a new data file comprising the compressed identified data and uncompressed data from the data file. The compressor data may further select a directory to compress, the directory comprising a plurality of data files, and select a folder to compress, the folder comprising a plurality of data files, wherein the client can perform functionality of the server, and wherein the server can perform functionality of the client.

In yet another embodiment of the present invention, a system for data transfer comprises a client comprising storage and a client data, and a server comprising a compressor data and information regarding data file types that have been compressed by the compressor data, wherein the client is operably coupled to the server, and wherein the client data intercepts a response for a requested data file stored on the server. If the requested information includes an identifier, requesting, by the client data, a compressed version of the data file, wherein the data file is one of the data file types that have been compressed, and wherein the client data sends the compressed version of the file to the storage, uncompresses the compressed version, stores the uncompressed version in the storage, and instructs the client to access the stored uncompressed version.

In yet another embodiment of the present invention, a system for data transfer comprises a client comprising software adapted to display data, storage, and a client data, and a server comprising a compressor data and information regarding data file types that have been partially compressed by the compressor data, wherein the client is operably coupled to the server, and wherein the client data intercepts a response for a requested data file stored on the server. If the requested information includes an identifier, requesting, by the client data, a partially compressed version of the data file, wherein the data file is one of the data file types that have been partially compressed, wherein the partially compressed version of the file is sent to the storage, accessed from the memory, and uncompressed by the client data, wherein the uncompressed version of the file is sent to the storage, and wherein the software accesses the uncompressed version of the file in the storage. The accessed uncompressed version of the file in the storage can be displayed via the software and/or may be transmittable to an electronic device.

Figure 6:
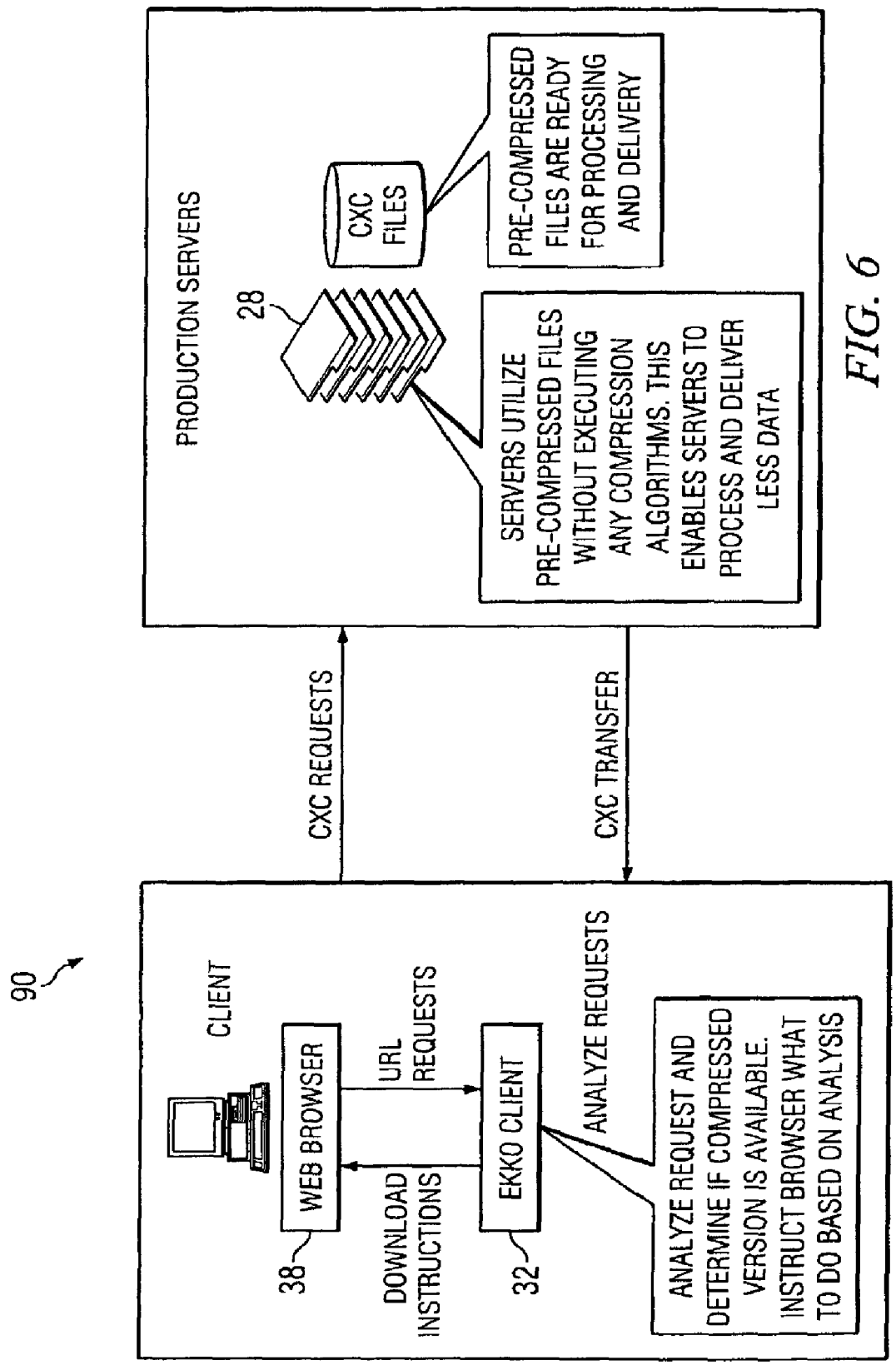
FIG. 6 depicts a block diagram of a product architecture according to the present invention.

Referring now to FIG. 6, an overall view 90 of the partial compression and the data transfer capabilities of the present invention are depicted. To summarize, an end-user with or without the Ekko Client plug-in 32 installed can visit a web site and begin to request web pages from the server 28. If the end-user has the plug-in 32 installed, the plug-in captures the user's requests from the browser 38 and determines if a compressed version of the request is available from the server. If the compressed version is available, the plug-in downloads the compressed file, expands it in cache and redirects the browser 38 to the cached file. The end-user does not experience any change in behavior and they continue to use the browser 38 as usual, but they should notice that pages are downloading at a much faster rate.

The plug-in 32 uses the browser APIs to communicate and download files from the server (which guarantees that no security issues or compatibility issues will be introduced at the client) and does not use any proprietary communications or protocols to retrieve data from the servers. End-users that have the plug-in 32 can visit sites with or without an enabled Ekko Compression plug-in 18 at the server 28. End-users that do not have the plug-in 32 can continue browsing the site because the original web page files are left intact and are available as usual. The plug-in 32 is also universal and does not require branding which means that a user can download the plug-in once from one site and have it work with all sites that support Ekko Compression.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for data transfer, the method comprising:
transmitting a request requesting first data, wherein the request includes an indication indicating compatibility with receiving a response in a compressed format;
receiving, in response to the request, second data, wherein the second data corresponds to the first data and comprises a compressed data and a uncompressed data,
uncompressing the compressed data of the received second data to produce third data,
preparing a combined data by combining at least a portion of the third data with at least a portion of the uncompressed data of the second data, and
visually presenting the combined data.

2. The method of claim 1, wherein the compressed data includes static HTML data and the uncompressed data includes dynamic content scripting resulting in an optimized dynamically scripted HTML file that can be executed by a web application server.

3. The method of claim 1, further comprising displaying the uncompressed compressed data and the uncompressed data.

4. The method of claim 3, further comprising displaying the uncompressed compressed data and the uncompressed data in an order similar to an order of the first data.

5. The method of claim 3, further comprising displaying the uncompressed compressed data and the uncompressed data in an order dissimilar to an order of the first data.

6. The method of claim 1, further comprising receiving the first data when the second data is unavailable.

7. The method of claim 1, wherein the request includes an identifier indicating compatibility with receiving a response that includes both compressed and uncompressed data.

8. The method of claim 1, further comprising receiving tracking information when the second data is unavailable.

9. The method of claim 1 wherein the receiving comprises receiving an HTTP response header indicating that the response is compressed.

10. A system for data transfer, the system comprising:
a client comprising software adapted to display data;
a server comprising compressor data and information regarding data file types that have been partially compressed by the compressor data,
wherein the client is operably coupled to the server;
wherein the client data transmits a request for information to the server;
wherein the server dynamically prepares a response to the request using a data file that has been partially compressed by the compressor data and without decompressing the data file;
wherein the server transmits the dynamically prepared response to the client; and
wherein the client receives the response and decompresses at least one compressed portion of the response, and presents a visual depiction of the response to a user.

11. The system of claim 10, wherein the visual depiction of the response is a rendering of a web page in a web browser.

12. The system of claim 10, wherein the partially compressed data includes static HTML data and the uncompressed data includes dynamic content scripting resulting in an optimized dynamically scripted HTML file that can be executed by a web application server.

13. The system of claim 10, wherein the client can perform functionality of the server.

14. The system of claim 10, wherein the server can perform functionality of the client.

* * * * *